United States Patent
Kim et al.

(10) Patent No.: US 7,812,765 B2
(45) Date of Patent: Oct. 12, 2010

(54) METHOD AND APPARATUS FOR CONTROLLING POWER SUPPLY FOR SPEEDY ACQUISITION OF GPS SIGNAL, AND GPS RECEIVER HAVING THE APPARATUS

(75) Inventors: Nam-woo Kim, Hanam-si (KR); Seong-woon Kim, Yongin-si (KR); Sun-gi Hong, Yongin-si (KR); In-hak Na, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 335 days.

(21) Appl. No.: 11/935,610

(22) Filed: Nov. 6, 2007

(65) Prior Publication Data

US 2008/0316094 A1 Dec. 25, 2008

(30) Foreign Application Priority Data

Jun. 19, 2007 (KR) ............ 10-2007-0060043

(51) Int. Cl.
G01S 1/00 (2006.01)
(52) U.S. Cl. ............................... 342/357.74
(58) Field of Classification Search ............. 342/357.06
See application file for complete search history.

(56) References Cited

U.S. PATENT DOCUMENTS 5,528,248 A 6/1996 Steiner et al.
6,909,907 B1 6/2005 Oyang et al.
7,336,224 B2 * 2/2008 King et al. ............. 342/357.06
2001/0029588 A1 10/2001 Nakamura et al.

FOREIGN PATENT DOCUMENTS

| EP | 1 136 837 | 9/2001 |
| KR | 2001-74352 | 8/2001 |
| KR | 20-0375701 | 3/2005 |
| WO | WO 95/05686 | 2/1995 |
| WO | WO 98/12846 | 3/1998 |
| WO | WO 2004/025320 | 3/2004 |

OTHER PUBLICATIONS

Extended Search Report issued by the European Patent Office on Jan. 20, 2009.

* cited by examiner

Primary Examiner—Thomas H Tarcza
Assistant Examiner—Harry Liu
(74) Attorney, Agent, or Firm—Jefferson IP Law, LLP

(57) ABSTRACT

Provided are a global positioning system (GPS) receiver which speedily acquires a GPS signal, and a method and apparatus for controlling power supply to the GPS receiver. The method includes when an external power is detected, supplying the external power to a GPS power supply unit and executing a GPS initial information search of a GPS module by enabling the GPS power supply unit using an external power detect signal, and when a power switch is turned on, executing a GPS information based communication of the GPS module by executing a navigation program while the GPS power supply unit is enabled.

22 Claims, 3 Drawing Sheets

METHOD AND APPARATUS FOR CONTROLLING POWER SUPPLY FOR SPEEDY ACQUISITION OF GPS SIGNAL, AND GPS RECEIVER HAVING THE APPARATUS

CROSS-REFERENCE TO RELATED APPLICATION

This application claims the benefit of Korean Patent Application No. 2007-60043, filed Jun. 19, 2007 in the Korean Intellectual Property Office, the disclosure of which is incorporated herein by reference.

BACKGROUND OF THE INVENTION

1. Field of the Invention

Aspects of the present invention relate to an apparatus for acquiring a global positioning system (GPS) signal, and more particularly, to a GPS receiver which speedily acquires a GPS signal, and a method and apparatus for controlling power supply to the GPS receiver.

2. Description of the Related Art

A conventional global positioning system (GPS) receiver calculates its own location by receiving location signals of at least 4 GPS satellites. When power is supplied to the GPS receiver, the GPS receiver searches for the satellite location signals through a GPS antenna and calculates its own location using location information received through the GPS antenna.

FIG. 1A is a block diagram illustrating a conventional GPS receiver. An external power jack is inputted to a power jack input unit 110. A main power supply unit 120 converts power received from the external power jack through the power jack input unit 110 to a rated voltage of the GPS receiver. At this time, when a power switch SW1 is turned on, the rated voltage is supplied to a control unit 140 and a GPS power supply unit 130 from the main power supply unit 120.

Upon receiving the rated voltage from the main power supply unit 120, the control unit 140 performs a booting operation in order to execute a navigation program. Here, when the navigation program is executed, the control unit 140 generates a GPS power enable signal which drives the GPS power supply unit 130.

Upon receiving the GPS power enable signal from the control unit 140, the GPS power supply unit 130 converts the rated voltage supplied from the main power supply unit 120 to a driving voltage of a GPS module unit 150. Accordingly, the GPS module unit 150 performs an initial operation for searching for a satellite signal through a GPS antenna (not shown) according to the driving voltage supplied from the GPS power supply unit 130. The GPS module unit 150 transmits the location information received through the GPS antenna to the control unit 140 when the initial operation during a predetermined time is completed, and receives a control command from the control unit 140.

FIG. 1B is a timing diagram for describing an acquisition of a GPS signal in a GPS receiver. First, when an external power is inputted through the power jack 110 in (a), a power switch SW1 is turned on after a user time in (b). Then, when the power switch SW1 is turned on, an operating system (OS) loading is performed by the control unit 140 in (c). After performing the OS loading, a navigation program is loaded by the control unit 140 in (d).

Next, after loading the navigation program for a predetermined time, a GPS signal is acquired by GPS module unit 150 in (e). Here, a GPS on and signal acquisition time is a difference between the GPS signal acquisition starting time in (e) and the navigation program loading starting time in (d). Also, a user slowdown speed time is a difference between the GPS signal acquisition starting time in (e) and the power switch on time in (b).

As illustrated in FIG. 1B, according to a conventional method of acquiring a GPS signal, when an external power is supplied, a GPS signal is acquired after the OS loading time in (c) and the navigation program executing time in (d) are all completed. Accordingly, there is a long waiting time for the GPS signal since the OS loading time in (c) and the navigation program executing time in (d) can only be started and completed after the power switch SW1 is turned on in (b).

SUMMARY OF THE INVENTION

Aspects of the present invention provide a method and apparatus for controlling power supply to a global positioning system (GPS) receiver which can improve the speed of acquiring a GPS signal by turning on a GPS power supply unit when an external power is supplied regardless of a program process of a central processing unit.

Aspects of the present invention also provide a GPS receiver including an apparatus for controlling power supply which can improve speed of acquiring a GPS signal.

According to an aspect of the present invention, there is provided a method of controlling power supply to a global positioning system (GPS) receiver, the method including: when an external power is detected, supplying the external power to a GPS power supply unit and executing a GPS initial information search of a GPS module by enabling the GPS power supply unit using an external power detect signal; and when a power switch is turned on, executing a GPS information based communication of the GPS module by executing a navigation program while the GPS power supply unit is enabled.

According to another aspect of the present invention, there is provided an apparatus for controlling power supply to a GPS receiver, the apparatus including: a main power supply unit which supplies inputted external power as a predetermined rated voltage; a control unit which executes a navigation program according to the rated voltage supplied from the main power supply unit and generates a GPS power enable signal, when a power switch is turned on; a power control logic unit which generates a power enable signal by logically combining the GPS power enable signal generated by the control unit and an external power detect signal; and a GPS power supply unit which supplies the rated voltage of the main power supply unit as a GPS driving voltage according to the power enable signal generated in the power control logic unit.

According to another aspect of the present invention, there is provided a GPS receiver, including: an external power jack input unit which inputs external power; a main power supply unit which converts the external power, received from the external power jack input unit, to a predetermined rated voltage; a control unit which, when a power switch is turned on, generating a GPS power enable signal by a navigation program executed by the rated voltage of the main power supply unit; a power control logic unit which generates a power enable signal by logically combining the GPS power enable signal generated by the control unit and a power jack input signal; a GPS power supply unit which converts the rated voltage of the main power supply unit to a GPS driving voltage according to the power enable signal generated by the power control logic unit; and a GPS module unit which, upon receiving the GPS driving voltage from the GPS power supply unit, searches for a GPS signal and communicates with the control unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
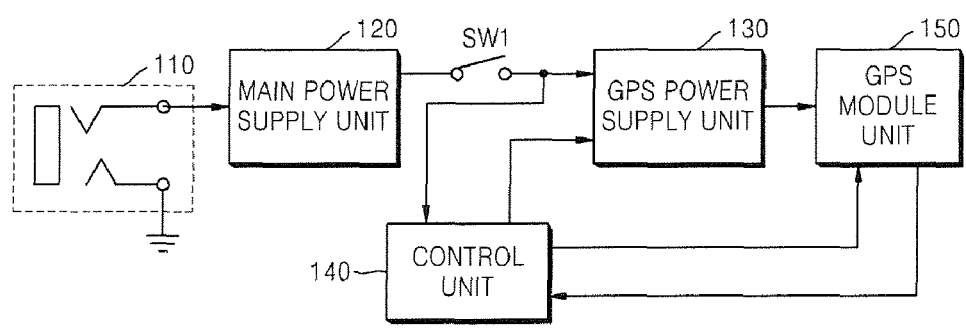
FIG. 1A is a block diagram illustrating a conventional global positioning system (GPS) receiver.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
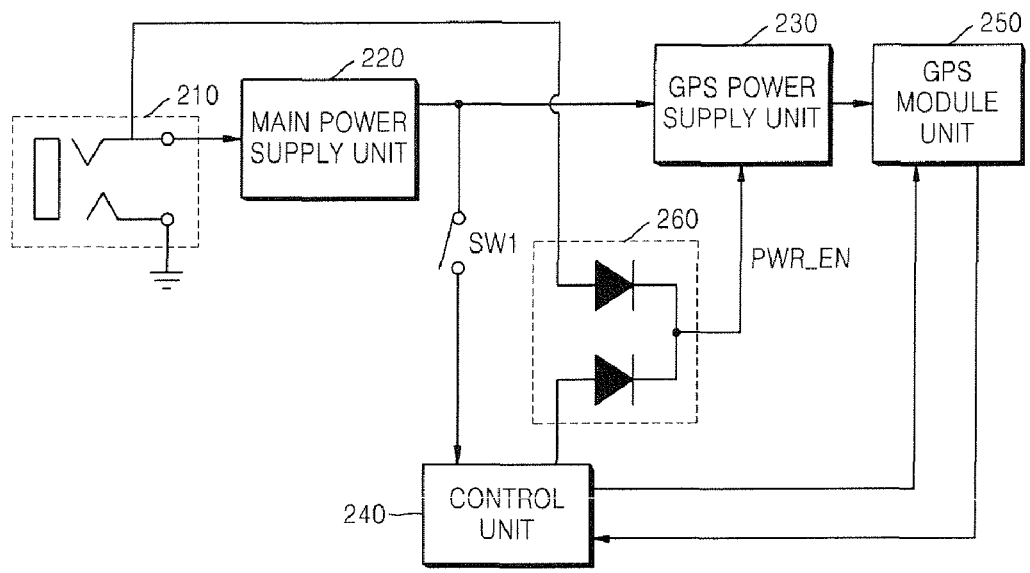
FIG. 2A is a block diagram illustrating a GPS receiver including an apparatus for controlling power supply according to an embodiment of the present invention.

FIG. 2A is a block diagram illustrating a GPS receiver including an apparatus for controlling power supply according to an embodiment of the present invention. A power jack input unit 210 inputs external power by an external power jack plugging into the power jack input unit 210. The power jack input unit 210 can comprise a plug to receive a power cord plug, such as a DC power jack or an AC power jack. While not restricted thereto, such plugs may be compatible with a Japan Electronics and Information Technology Industries Association (JEITA) or Electronic Industries Association of Japan (EIAJ) plug standard.

The power jack input unit 210 is connected to both a main power supply unit 220 and to a power control logic unit 260. When the external power is inputted through the power jack input unit 210, the power jack input unit 210 sends an external power detect signal to the power control logic unit 260 and the main power supply unit 220 converts the external power to a rated voltage. The rated voltage is supplied to a GPS power supply unit 230 and to a switch SW1. The switch SW1 selectively connects the main power supply unit 220 and the control unit 240 to control the supply of the rated voltage to the control unit 240 without affecting the supply of the rated voltage to the GPS power supply unit 230.

When the power switch SW1 is turned on, a control unit 240 generates a GPS power enable signal by an execution of a navigation program, and transceives GPS data with a GPS module unit 250. When the power switch SW1 is turned on, the control unit 240 performs a booting operation and executes the navigation program using the rated voltage of the main power supply unit 220. The control unit 240 generates the GPS power enable signal according to the navigation program. The generation of the GPA power enable signal can be independent of whether the external power is inputted through the power jack input unit 210, such as when the main power supply unit 220 uses an internal energy source like a battery or fuel cell.

The power control logic unit 260 generates a power enable signal PWR_EN based upon either the generated power enable signal or by the external power detect signal. In the shown example, the power control logic unit 260 logically combines the GPS power enable signal generated in the control unit 240, and the external power detect signal detected in the power jack input unit 210. Using this logical combination, the power control logic unit 260 sets the power enable signal PWR_EN by at least one of the external power detect signal detected by an input of the external power, and power enable signals generated by executing the navigation program. For example, the power control logic unit 260 may be realized in an OR logic circuit formed of a plurality of diodes or a plurality of transistors.

While not required in all aspects, the external power detect signal is generated using a voltage inputted from the power jack input unit 210, but can also be detected using a separate power detect circuit. For example, when an external power jack is inserted into the power jack input unit 210, the external power detect circuit generates the external power detect signal by converting power inputted from the external power jack at the power jack input unit 210 to a logic high signal as the external power detect signal. A similar circuit or unit can be incorporated into the power jack input unit 210 to generate the logic high signal as the external power detect signal. However, the external power circuit is not limited thereto, and that the external power detect signal can be other than a logic high signal.

The GPS power supply unit 230 converts the rated voltage of the main power supply unit 220 to a predetermined GPS driving voltage according to the power enable signal PWR_EN generated in the power control logic unit 260. The GPS module unit 250 searches for a satellite signal through a GPS antenna (not shown) using the power supplied from the GPS power supply unit 230, and transceives navigation data or a user control command with the control unit 240. While not required, the control unit 240 can output the navigation data in the form of a map on a display (not shown). Such a map can be stored as map data in a memory (not shown) to be retrieved by the control unit 240 when a display is needed.

A process of acquiring the GPS signal using the apparatus for controlling power supply of the GPS receiver according to an embodiment of the invention will now be described with reference to FIG. 2A. The main power supply unit 220 converts the power received from the external power jack through the power jack input unit 210 to a rated voltage of the GPS receiver. Here, the rated voltage of the main power supply unit 220 is supplied to the GPS power supply unit 230. Also, when the external power is inputted to the power control logic unit 260 from the power jack input unit 210, the power control logic unit 260 generates the power enable signal PWR_EN using the external power. Accordingly, the GPS power supply unit 230 converts the rated voltage supplied from the main power supply unit 220 to a driving voltage of the GPS module unit 250 by simultaneously receiving the rated voltage from the main power supply unit 220 and the power enable signal PWR_EN from the power control logic unit 260. Then, the GPS module unit 250 performs an initial operation of searching for a satellite signal through the GPS antenna according to the driving voltage supplied from the GPS power supply unit 230. The initial operation is thus performed independent of a state of the switch SW1 or of the state of the operating system and the navigation program in the control unit 240 and can be performed prior to the loading or execution of either the operating system or the navigation program.

When the power switch SW1 is turned on, the rated voltage is supplied to the control unit 240 from the main power supply unit 220. Upon receiving the rated voltage from the main power supply unit 220, the control unit 240 executes the navigation program by performing a booting operation while the GPS power supply unit 230 is enabled. At this time, the control unit 240 generates a GPS power enable signal which drives the GPS power supply unit 230 using the executed navigation program. The power control logic unit 260 generates the power enable signal PWR_EN using the GPS power enable signal generated from the control unit 240. Thus, the GPS power supply unit 230 maintains an on state by the power enable signal PWR_EN either when the control unit 240 generates the GPS power enable signal or the external power is input to the power jack input unit 210 such that the external power detect signal is generated.

Next, when the initial operation is completed after a predetermined time using the driving voltage of the GPS power supply unit 230, the GPS module unit 250 transmits location information received through the GPS antenna (not shown) to the control unit 240 and receives a navigation control command from the control unit 240. Accordingly, when the power switch SW1 is turned on, the GPS module unit 250 performs a GPS information based communication by executing the navigation program while the GPS power supply unit 230 is enabled.

Alternatively, when a built in battery (not shown) is used instead of the external power, the navigation program is loaded by driving the control unit 240, when the power switch SW1 is turned on. Then, the GPS power supply unit 230 is driven according to the power enable signal PWR_EN generated by the navigation program.

Figure 2B:
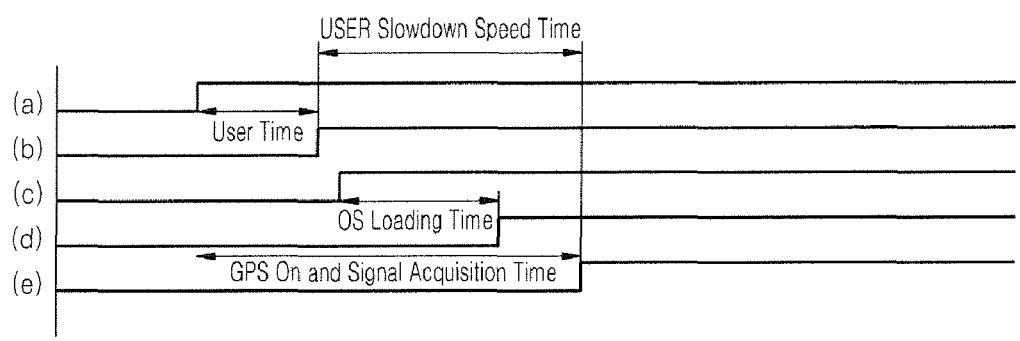
FIG. 2B is a timing diagram for describing an acquisition of a GPS signal in a GPS receiver according to an embodiment of the present invention.

FIG. 2B is a timing diagram for describing an acquisition of a GPS signal in the GPS receiver of FIG. 2A according to an embodiment of the present invention. When an external power is inputted in (a), the GPS module unit 250 of the GPS receiver performs a GPS initial information search in (d) regardless of an on state of the power switch SW1.

Then, when the power switch SW1 is turned on after a predetermined time (user time) in (b), the control unit 240 of the GPS receiver performs an operating system (OS) loading. Then, when the OS loading is completed, the control unit 240 of the GPS receiver starts to load a navigation program in (d). Next, after loading the navigation program for a predetermined time, the GPS module unit 250 of the GPS receiver starts to acquire a GPS signal in (e).

As illustrated in FIG. 2B, the GPS receiver starts to search for the GPS information when the external power is supplied, instead of when the power switch SW1 is turned on as with the device in FIG. 1A. Accordingly, a time taken to acquire a GPS signal can be reduced. As such, the GPS information search occurs while the OS is loading, whereas the device in FIG. 1A does not begin the GPS information search until after the operating system or navigation program is loaded.

Figure 1B:
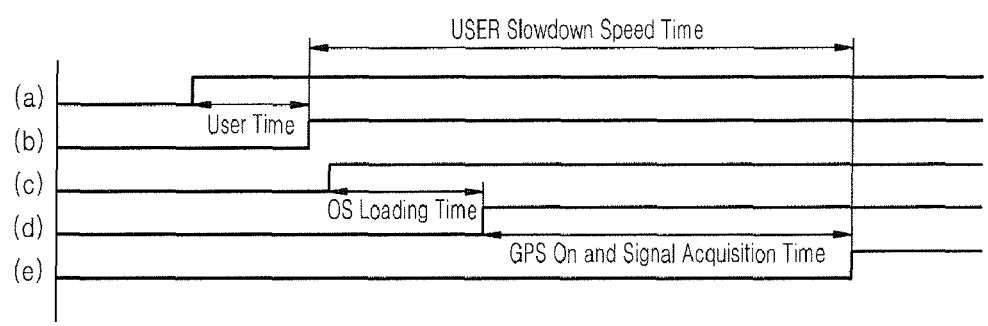
FIG. 1B is a timing diagram for describing an acquisition of a GPS signal in the conventional GPS receiver.

Here, a GPS on and signal acquisition time is a difference between a GPS signal acquisition starting time in (e) and an external power inputting time in (a). Also, a user slowdown speed time is a difference between the GPS signal acquisition starting time in (e) and a power switch turning on time in (b). Comparing FIGS. 1B and 2B, the GPS on and signal acquisition time and the user slowdown speed time according to the present invention are shorter than the GPS on and signal acquisition time and the user slowdown speed time according to a conventional technology.

Figure 3:
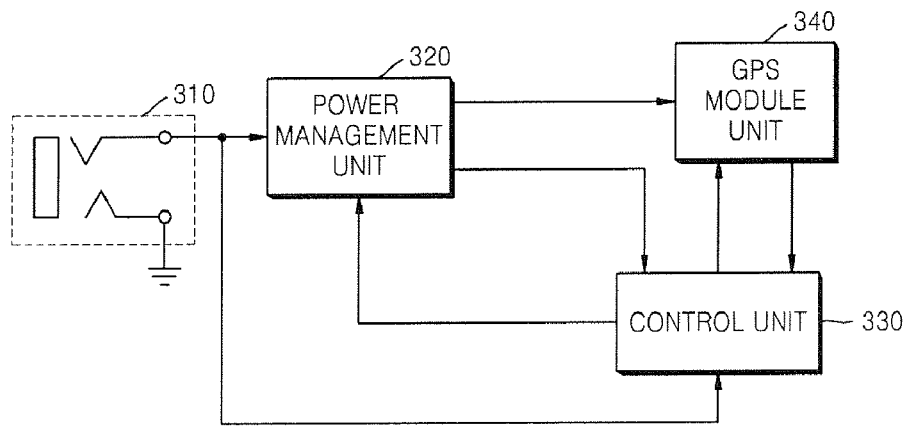
FIG. 3 is a block diagram illustrating a GPS receiver including an apparatus for controlling power supply according to another embodiment of the present invention.

FIG. 3 is a block diagram illustrating a GPS receiver including an apparatus for controlling power supply according to another embodiment of the present invention. The GPS receiver includes a power jack input unit 310, a power management unit 320, a control unit 330, and a GPS module unit 340. The power jack input unit 310 receives external power by inputting an external power jack plugging to the power jack input unit 310. The power jack input unit 310 supplies power to the control unit 330 and the power management unit 320.

When the external power is received through the power jack input unit 310, the power management unit 320 supplies a rated voltage to the control unit 330. When the rated voltage is received from the power management unit 320 and the external power is simultaneously detected, the control unit 330 outputs a GPS power output on command to the power management unit 320 regardless of an OS loading operation. Thus, even when the OS has not loaded, the control unit 330 issues the GPS power output to the power management unit 320. No switch is between the control unit 330 and the power management unit 320 in the shown embodiment.

At the same time the external power is received through the power jack input unit 310 and at the control unit 330, the power management unit 320 receives the external power through the power jack input unit 310 and supplies the rated voltage to the GPS module unit 340. The GPS module unit 340 performs an initial operation of searching for a satellite signal through a GPS antenna (not shown) according to a driving rated voltage supplied from the power management unit 320. Simultaneously, the control unit 330 starts a booting operation and executes a navigation program as the initial operation of searching for a satellite signal is being performed. When the initial operation is completed, the GPS module unit 340 performs a GPS information based communication with the control unit 330 using the GPS signal received through the GPS antenna.

Figure 4:
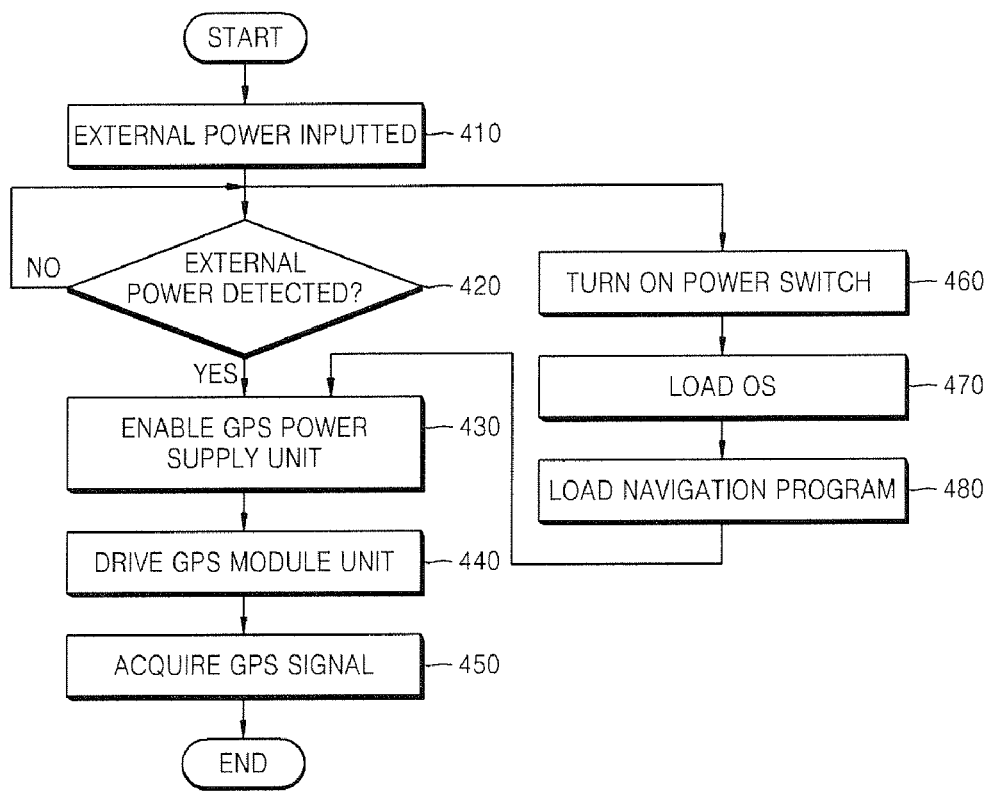
FIG. 4 is a flowchart illustrating a method of controlling power supply for improving the speed of acquiring a GPS signal according to an embodiment of the present invention.

FIG. 4 is a flowchart illustrating a method of controlling power supply for improving the speed of acquiring a GPS signal according to an embodiment of the present invention with reference to the embodiment in FIG. 2A. However, it is understood that like operations are performed in the embodiment shown in FIG. 3. First, external power is inputted to the power jack input unit 210 using an external jack or the like in operation 410. In operation 420, it is checked whether the external power is detected. When the external power is not detected, operation 420 is repeated.

When the external power is detected in operation 420, a GPS power supply unit 230 is enabled in operation 430. In operation 440, a GPS module unit 250 is driven according to a voltage supplied by the GPS power supply unit 230. Then, the GPS module unit 250 performs an initial operation of searching for a satellite signal through a GPS antenna according to a driving voltage supplied from the GPS power supply unit 230.

Meanwhile, when a power switch SW1 is turned on at a predetermined time in operation 460, an OS loading is performed by the control unit 240 in operation 470. When the OS loading is completed, a GPS power enable signal is generated by the control unit 240 in operation 480 by starting to load a navigation program. At this time, the GPS power supply unit 230 maintains an enable state by the GPS power enable signal. Also, the GPS power supply unit 230 is driven in parallel to the execution of the navigation program by the control unit

240. Alternatively, the control unit 330 controls the power management unit 320 to maintain a power output to the GPS module unit 340.

Accordingly, since the GPS module unit 250 maintains the enable state, the GPS signal is acquired in operation 450 immediately after the initial operation is completed. Meanwhile, when the external power is not detected, it is determined that a built in battery is used. Accordingly, when the external power is not detected, the power switch SW1 is checked whether it is turned on. When the power switch is turned on, the operating system is booted and the navigation program is loaded by the control unit 240, and the GPS power supply unit 230 is driven according to the power enable signal generated by the navigation program. Similarly, when the control unit 330 receives the power on signal, the control unit 33, the navigation program is loaded and the power management unit 320 is driven.

While not required in all aspects, aspects of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, while on/off of a conventional GPS power supply unit is controlled by a GPS power enable signal outputted from a central processing unit (CPU), a GPS power supply unit according to aspects of the present invention is turned on when external power is supplied regardless of the CPU, and thus the speed of acquiring a GPS signal is improved. For example, when a booting time of an OS and a driving time of a navigation program takes 11 seconds, and a time for acquiring a GPS signal after applying power to a GPS module unit takes 20 seconds, a conventional user slowdown speed time is total of 31 seconds. However, in an example of the present invention, a user slowdown speed time is a total of 20 seconds since the GPS signal is acquired in parallel with booting an OS and loading a navigation program. Also, after the OS is booted and the navigation program is loaded, a conventional GPS signal acquisition time is 20 seconds but a GPS signal acquisition time of an example of the present invention is 9 seconds.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a power supply of a global positioning system (GPS) receiver, the method comprising:
    when an external power is detected and prior to completing booting of an operating system (OS) or execution of a navigation program for the GPS receiver, supplying the external power to a GPS power supply unit to supply power to a GPS module and executing a GPS initial information search by the GPS module by enabling the GPS power supply unit using an external power detect signal; and
    when a power switch is turned on, executing a GPS information based communication of the GPS module by executing the OS and a navigation program while the GPS power supply unit is enabled.

2. The method of claim 1, wherein the executing of the GPS initial information search comprises:
    converting the external power to a rated voltage and supplying the rated voltage to the GPS power supply unit;
    generating a power enable signal when the external power is detected; and
    supplying the rated voltage for use in the GPS initial information search executing according to the generated power enable signal.

3. The method of claim 1, wherein the GPS power supply unit is selectively enabled by the external power detect signal, which is detected by an input of the external power, and a power enable signal, which is generated by executing the navigation program.

4. The method of claim 3, wherein the enabling of the GPS power supply unit comprises comparing the external power detect signal and the power enable signal using OR logic to determine when to selectively enable the GPS power supply unit.

5. The method of claim 1, wherein the GPS power supply unit is enabled and supplies the power to the GPS module prior to the execution of the navigation program.

6. The method of claim 1, further comprising:
    when the external power is not detected, checking whether the power switch is turned on; and
    when the power switch is turned on and the external power is not detected, driving the GPS power supply unit according to a power enable signal, which is generated by loading the navigation program.

7. An apparatus for controlling a power supply of a Global Positioning System (GPS) receiver, the apparatus comprising:
    a main power supply unit which supplies inputted external power at a predetermined rated voltage;
    a power switch having an on state and an off state;
    a control unit which, when the power switch is turned from the off state to the on state, executes a navigation program according to the rated voltage supplied from the main power supply unit while generating a GPS power enable signal;
    a power control logic unit which generates a power enable signal by logically combining the GPS power enable signal generated by the control unit and an external power detect signal generated when external power is supplied to the GPS receiver; and
    a GPS power supply unit which supplies the rated voltage of the main power supply unit as a GPS driving voltage to drive a GPS module to initiate a GPS initial information search according to the power enable signal generated in the power control logic unit and regardless of the on or off state of the power switch.

8. The apparatus of claim 7, wherein the power control logic unit is selectively enabled by the external power detect signal, which is detected by an input of the external power, and a power enable signal, which is generated by the control unit executing the navigation program.

9. The apparatus of claim 7, wherein the power control logic unit comprises an OR logic circuit such that the power enable signal is generated when the external power signal is received or when the control unit outputs the power enable signal.

10. An apparatus for controlling a power supply of a Global Positioning System (GPS) receiver, comprising:
    a power management unit which, when an external power is detected, supplies power to the GPS receiver and executes an initial operation of the GPS receiver according to a GPS power output command; and a controller which selectively generates the GPS power output command when the controller executes a navigation program according to the power supplied from the power management unit and when an external power detect signal is received prior to execution of the navigation program, and communicates with the GPS receiver.

11. A Global Positioning System (GPS) receiver, comprising:

an external power jack input unit which inputs external power and issues a power jack input signal when an external jack is plugged in;

a main power supply unit which converts the external power, received from the external power jack input unit, to a predetermined rated voltage;

a control unit which, when a power switch is turned on, selectively generates a GPS power enable signal while executing a navigation program using the rated voltage of the main power supply unit;

a power control logic unit which generates a power enable signal by logically combining the GPS power enable signal generated by the control unit and the power jack input signal issued by the external power jack input unit;

a GPS power supply unit which converts the rated voltage of the main power supply unit to a GPS driving voltage according to the power enable signal generated by the power control logic unit; and a GPS module unit which, upon receiving the GPS driving voltage from the GPS power supply unit, searches for a GPS signal and communicates with the control unit to use the GPS signal with the executed navigation program.

12. A method of controlling power supply to a global positioning system (GPS) receiver, the method comprising:

prior to an operating system (OS) or a navigation program for the GPS receiver being executed, supplying an external power to a GPS module such that the GPS module initiates a search and acquisition of a GPS signal to obtain GPS information for use once the navigation program is executed; and while the GPS module initiates the search, using the supplied external power to execute the OS and the navigation program such that the navigation program uses the searched GPS information to determine a location of the GPS receiver.

13. The method of claim 12, wherein the supplying the external power further comprises detecting a connection of an external power source to the GPS receiver, generating an external power detection signal when the connection is detected, and controlling the supply of the external power to the GPS module according to the generated external power detection signal prior to the OS or the navigation program for the GPS receiver being executed.

14. The method of claim 13, wherein the controlling the supply of the external power to the GPS module further comprises, when an input is received for a controller to execute the navigation program, controlling the supply of the external power to the controller to allow execution of the OS and the navigation program by the controller while controlling the supply of the external power to the GPS module.

15. The method of claim 12, further comprising:

when the external power is supplied to the GPS module, searching for satellite location signals through a GPS antenna prior to the OS or the navigation program for the GPS receiver being executed, and after the OS and navigation program are executed, determining the location of the GPS receiver using the searched satellite location signals according to calculations made by the executed navigation program.

16. A global positioning system (GPS) receiver, comprising:

a controller powered by a control voltage and which executes a navigation program using GPS information to determine a location of the GPS receiver;

a GPS module powered by a module voltage and which, prior to the controller executing the navigation program, initiates a search and acquisition of satellite location signals to obtain the GPS information used by the executed navigation program; and a power supply unit which converts power received from an external power supply to the control voltage and the module voltage, supplies the control voltage to the controller, and supplies the module voltage to the GPS module.

17. The GPS receiver of claim 16, further comprising an external power supply port detachably connectable to the external power supply and through which power from the connected external power supply is provided to the GPS receiver.

18. The GPS receiver of claim 17, further comprising an external power supply detector which detects when the external power supply port is connected to the external power supply, and sends a signal to the controller to control the power supply unit to supply the module voltage to the GPS module prior to the controller executing the navigation program.

19. The GPS receiver of claim 18, wherein the controller comprises:

a control unit which executes the navigation program, and a logic circuit which detects when the external power supply detector sends the signal and controls the power supply unit to supply the module voltage to the GPS module prior to the control unit executing the navigation program when the signal is received.

20. The GPS receiver of claim 19, wherein:

during execution of the navigation program, the control unit issues another signal, and the logic circuit further detects when the control unit sends the another signal, and controls the power supply unit to supply the module voltage to the GPS module when the signal is received prior to the control unit executing the navigation program, and when the another signal is received after the control unit executes the navigation program.

21. The GPS receiver of claim 16, further comprising a switch between the power supply unit and the controller which, when in an off state, prevents the control voltage from reaching the controller such that the controller does not execute the navigation program, and when in an on state, allows the control voltage to reach the controller such that the controller executes the navigation program, wherein the GPS module is powered by the module voltage when the switch is in the on state and when the switch is in the off state.

22. The GPS receiver of claim 16, wherein, after the navigation program is executed, the GPS module continues obtaining the GPS information using the acquired GPS signal and the controller uses the navigation program to calculate the location of the GPS receiver using the searched satellite location signals.

* * * * *